United States Patent [19]
Wetrich et al.

[11] 3,760,918
[45] Sept. 25, 1973

[54] TRACTOR PTO AND PROPULSION CLUTCH ASSEMBLY INCLUDING LUBRICATION MEANS

[75] Inventors: Peter Donald Wetrich; Lyle Robert Madson, both of Cedar Falls; Wesley Walter Weissenfluh, Dike, all of Iowa

[73] Assignee: Deere & Company, Moline, Ill.

[22] Filed: Apr. 20, 1972

[21] Appl. No.: 245,737

[52] U.S. Cl. ..... 192/87.11, 192/113 B, 192/85 CA, 251/26, 137/625.6
[51] Int. Cl. ........................ F16d 25/10, F16d 13/72
[58] Field of Search .................... 192/87.11, 87.12, 192/113 B

[56] References Cited
UNITED STATES PATENTS

| | | | |
|---|---|---|---|
| 2,636,585 | 4/1953 | Livermore | 192/87.11 |
| 3,138,964 | 6/1964 | Stockton | 192/97.11 X |
| 2,969,131 | 1/1961 | Black et al. | 192/113 B X |
| 3,292,758 | 12/1966 | Polak | 192/113 B X |
| 3,351,169 | 11/1967 | McIndoe | 192/113 B X |

Primary Examiner—Benjamin W. Wyche
Attorney—H. Vincent Harsha et al.

[57] ABSTRACT

A tractor transmission includes a hollow PTO input drive shaft having a propulsion input drive shaft located therein, the ends of the shafts terminating adjacent an engine flywheel and carrying PTO and propulsion clutch elements for selectively fixing one or the other or both of the shafts to the flywheel for rotation therewith. The clutch elements are respectively actuated into engagement with a backing plate carried by the flywheel by means of a pair of concentrically arranged fluid-operated pistons. A pilot-operated clutch-lubrication-fluid control valve shifts in response to the operating pressure acting on the pistons to block the flow of fluid to the clutches when both clutches are disengaged, to permit a predetermined amount of fluid to flow to both clutches when both or only the propulsion clutch is engaged and to permit a lesser amount of fluid than said predetermined amount to flow toward the clutches when only the PTO clutch is engaged. A restriction is located in the lubrication fluid passage between the connection of the passage with the PTO and propulsion clutches and the restriction acts to cause substantially all of the lesser amount of fluid to flow to the PTO clutch when only the PTO clutch is engaged.

9 Claims, 3 Drawing Figures

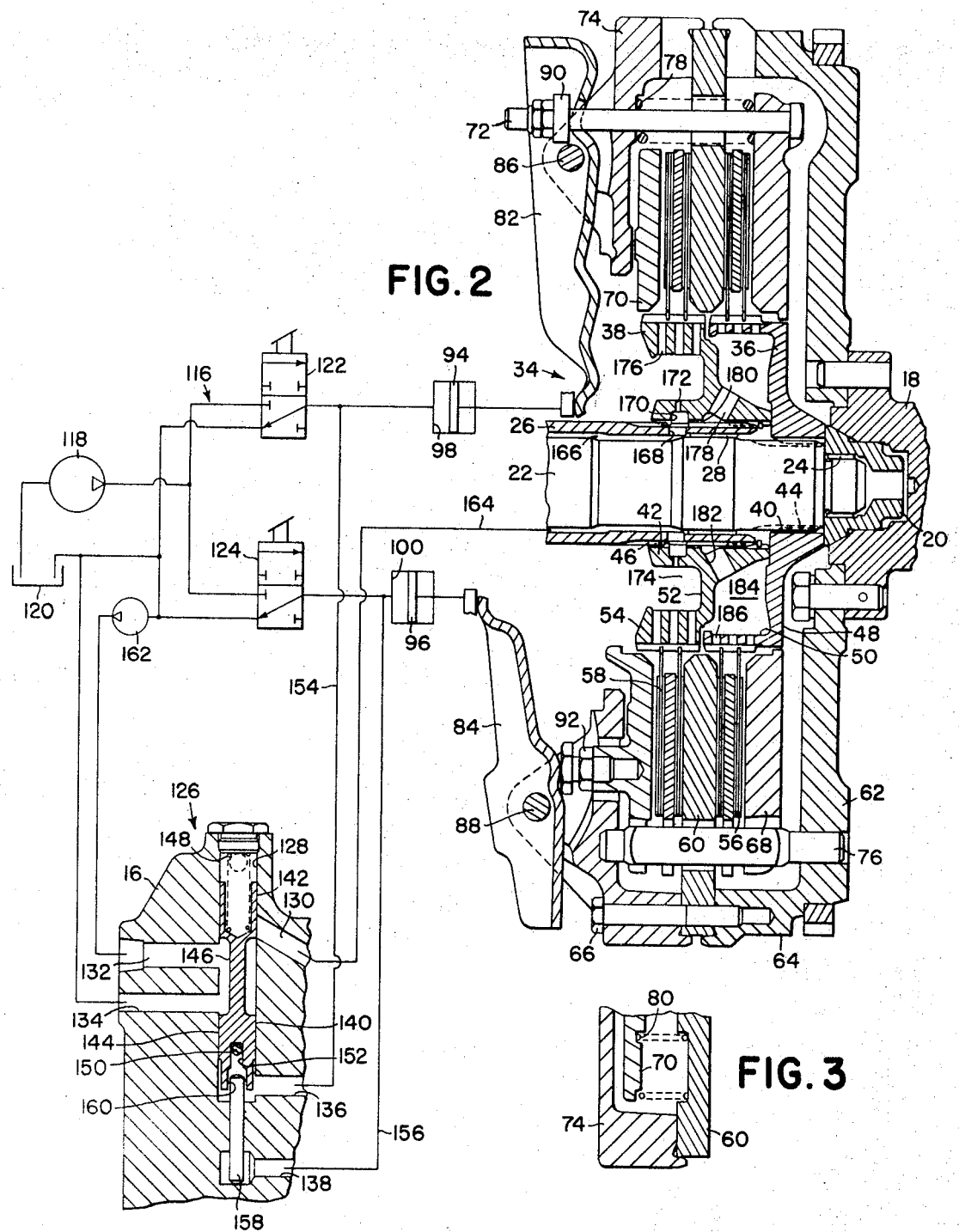

3,760,918

TRACTOR PTO AND PROPULSION CLUTCH ASSEMBLY INCLUDING LUBRICATION MEANS

BACKGROUND OF THE INVENTION

The present invention relates to a multiple disc clutch assembly and more particularly relates to a compact PTO and propulsion clutch assembly including a lubrication system for supplying fluid to the friction elements of the clutches, as required, in response to the operating pressures respectively found in a pair of hydraulic actuators for operating the clutches.

Combined PTO and propulsion clutch assemblies are known in the art but many lack one or more of the attributes of being compact, simple in design, and capable of dissipating heat generated by their friction elements.

SUMMARY OF THE INVENTION

According to the present invention, there is provided a compact PTO and propulsion clutch assembly. The clutches are wet clutches and include respective friction elements that are selectively actuated to engage the opposite faces of a common backing plate through means including a pair of annular hydraulic pistons arranged concentrically to each other and to the PTO and traction drive input shafts. A pressure responsive pilot valve is connected to the pistons and is operative in response to the pressures in the pistons and in conjunction with a restriction located in the lubrication passage between the respective friction elements of the clutches to direct the flow of lubrication fluid to both of the elements when both clutches are or only the traction clutch is engaged, to the PTO clutch element when only the traction clutch is disengaged and to the sump when both clutches are disengaged.

It is an object of this invention to provide a compact dual clutch arrangement capable of being housed in a relatively small housing.

A more specific object is to provide a pair of clutches including a common backing plate against the opposite sides of which the friction elements of the respective clutches are engageable, such engagement being made through means including a pair of annular hydraulic actuating pistons positioned concentrically to each other.

A further object is to provide wet clutches adapted to be cooled by lubrication fluid and to provide a lubrication fluid supply system including a pilot valve connected to and responsive to the pressure in the actuators to control the flow of fluid to the clutches.

A more specific object is to provide a pilot valve, as aforementioned, which will limit the flow of lubrication fluid to a fluid passage connecting the clutches in parallel and to provide a restriction in the passage for preventing the limited flow of fluid from passing to one of the clutches when it is disengaged.

These and other objects will be apparent from the following description and the appended drawings.

BRIEF DESCRIPTION OF THE DRAWINGS

FIG. 2 is a partial sectional and schematic view of the clutch lubrication system for the clutch assembly shown in FIG. 1.

FIG. 3 is a broken sectional view showing one of the springs acting to disengage the PTO clutch.

DESCRIPTION OF THE PREFERRED EMBODIMENT

Figure 1:
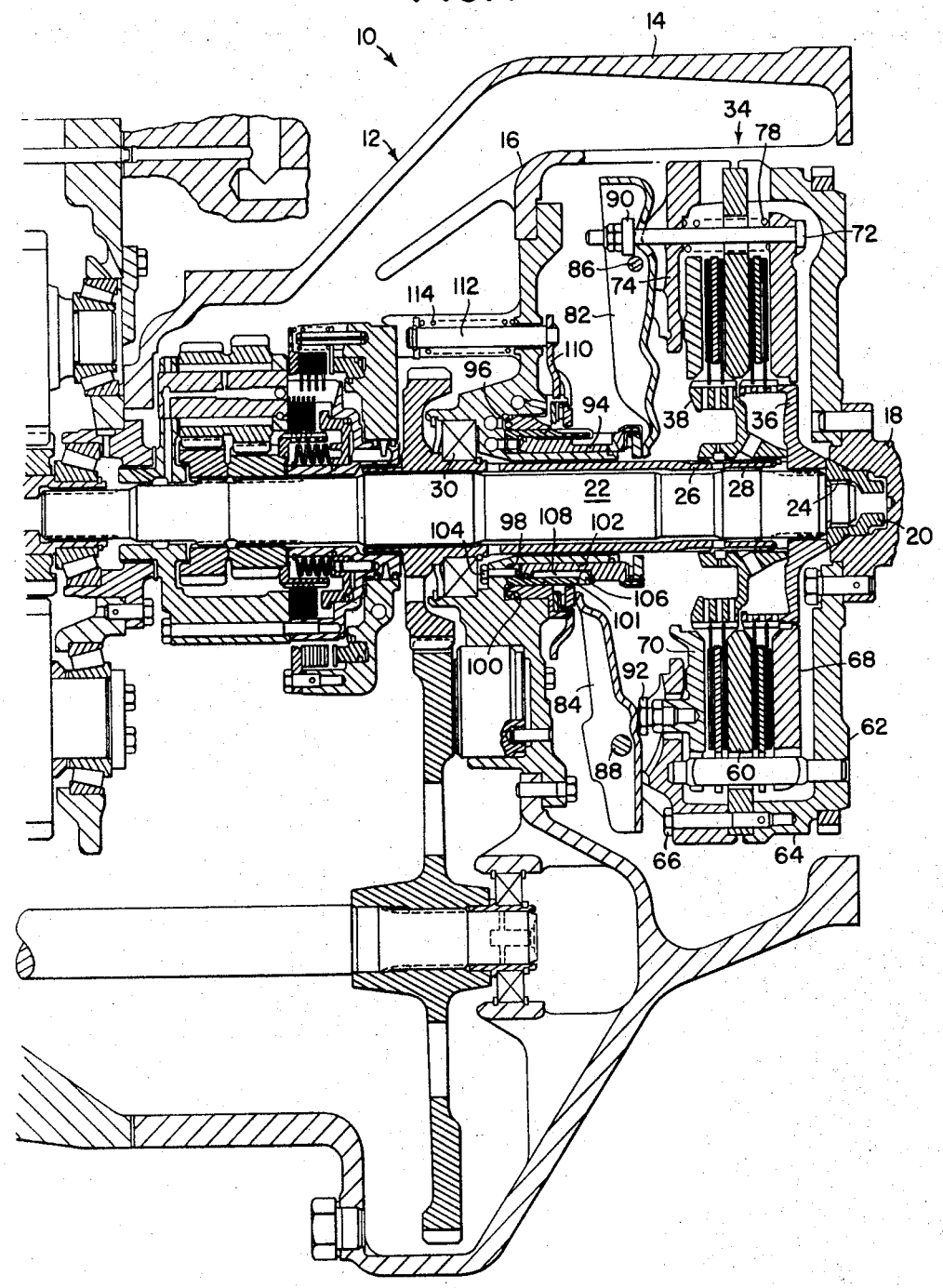
FIG. 1 is a longitudinal sectional view of a transmission portion embodying the clutch assembly of the present invention.

Referring now to the drawings, therein is shown a portion of a transmission indicated in its entirety by the reference numeral 10. The transmission 10 is of a type for use with a tractor, or other type of vehicle, having a pair of driven traction or propulsion wheels and a power take-off (hereinafter abbreviated as PTO) drive.

Specifically, the transmission 10 includes a generally hollow housing 12 including, as viewed in the drawings, a rightward generally cylindrical clutch housing 14 delimited at its left end by a support wall 16 having a function to be described presently. Located centrally within the clutch housing 14 at the right end thereof is an end of an engine output shaft 18 in which a cylindrical receptacle is formed axially therein, the receptacle containing a bushing 20. Extending in axial alignment with the shaft 18 is a propulsion or traction drive input shaft 22 which passes through a cylindrical opening in the support wall 16 and has its right end rotatably supported, as at 24, in the bushing 20.

The input shaft 22 is located coaxially within a tubular PTO drive input shaft 26 which has its right end rotatably supported on the shaft 22, as at 28, at a location spaced slightly leftwardly of the right end of the shaft 22. The left end portion of the shaft 26 is rotatably supported in the housing wall 16, as at 30.

For the purpose of selectively connecting one or the other or both of the input shafts 22 and 26 for rotation with the engine shaft 18, a dual clutch assembly 34 is provided in the clutch housing 14. The clutch assembly 34 includes traction and PTO clutch members 36 and 38, respectively. The clutch members 36 and 38 respectively include hubs 40 and 42 respectively fixed for rotation with the input shafts 22 and 26 by means of respective spline connections 44 and 46 located at the right ends of the input shafts. The left end of the hub 40 is in the form of a circular radially extending plate portion 48 which is integral with a leftwardly extending annular rim 50. The hub 42 includes a circular radially extending plate portion 52 located intermediate the right and left ends thereof, the plate portion 52 being in general radial alignment with the left end of the rim 50 of the hub 40, and an annular rim 54 being integral with the plate portion 52 and extending leftwardly in axial alignment with the rim 50. Respectively axially shiftably mounted on the rims 50 and 54 are a pair of annular friction disc elements 56 and 58 between which is located an annular backing plate 60 having right and left axially facing friction surfaces disposed for engagement by the elements 56 and 58. The backing plate 60 is fixed for rotation with the engine output shaft 18 through means of a flywheel 62 fixed directly to the shaft 18 and having a rim structure 64 comprising two pieces clamped together on the outer peripheral portions of the friction surface of the plate 60 by means of a plurality of screws, one of which is shown at 66. Arranged to engage these sides of the friction elements 56 and 58 which respectively face oppositely from the backing plate 60 are a pair of annular pressure plates 68 and 70. The plate 68 is mounted for rotation with the flywheel 62 and for axially shifting movement toward and away from the friction element 56 through means of a plurality of long bolts, only one being shown at 72, which extend parallel to the axis of rotation of the flywheel and are slidably mounted in a radial flange 74 of the flywheel rim structure 64. The plate 70 is also mounted for rotation with the flywheel 62 and is mounted for axially shifting movement toward and away from the friction element 58 through means of a plurality of pilot pins, only one being shown at 76 which extends parallel to the axis of rotation of the flywheel through notched ears of each of the friction elements 56 and 58, the backing plate 60 and the pressure plates 68 and 70, and have their opposite ends fixed in the flywheel. The pressure plates 68 and 70 are normally biased away from engagement with the friction elements 56 and 58 by respective sets of helical compression springs, only one of each set being respectively shown at 78 (FIG. 2) and 80 (FIG. 3). The springs 78 encircle the long bolts 72 and are compressed between the right face of the flange 74 and the left face of the pressure plate 68, and the springs 80 are compressed between the right face of the pressure plate 70 and the left face of the backing plate 60.

Actuating means are provided for selectively axially shifting the pressure plates 68 and 70 to engage one or the other or both of the friction elements 56 and 58 with the backing plate 60 to drivingly interconnect one or the other or both of the drive input shafts 22 and 26 with the engine output shaft 18. Specifically, first and second sets of levers, only one of each being shown respectively at 82 and 84, are radially arranged relative to the axis of rotation of the concentric shafts 22 and 26, and each are pivoted to the flywheel flange 74 for swinging movement in the axial direction about respective pins 86 and 88 extending cross-wise to the axis of rotation of the shafts 22 and 26. The long bolts 72 are located radially outwardly of the pin 86 and the levers 82 are each loosely received on a respective bolt 72 at a location between the left side of the flange 74 and a stop means 90 on the left end of each bolt. Secured to the left side of the pressure plate 70 at a location radially inwardly of a respective pin 88 and in the path of movement of each of the levers 84 is an adjustable lever engaging surface in the form of a screw 92. The radially inner ends of the levers 82 and 84 respectively terminate in the paths of axial shifting movement of concentrically arranged annular hydraulic pistons 94 and 96 respectively reciprocally received in annular cylinders 98 and 100 arranged concentrically to the rotational axis of the shafts 22 and 26. The cylinders 98 and 100 are formed in part by an annular recess 102 in the right side of the support wall 16 and in part by a sleeve 101 which is fixed in the recess 102 by screws, one of which is shown at 104, and divides the recess into two annular parts. The rotation of the piston 94 is limited by a ball shown at 106, which is retained in a recess in the sleeve 101 and is received in an axial groove 108 in the outer wall of the piston 94. For the purpose of axially retracting and limiting the rotation of the piston 96, a plate 110 is axially shiftably mounted from the support wall 16 by means of pins, one of which is shown at 112, the plate including a tab engaging the right end of the piston 96 and being biased rearwardly by means of compression springs 114 encircling the pins 112 and acting between the wall 16 and stop rings carried on the left ends of the pins 112.

Operating fluid is supplied to and exhausted from the pistons 94 and 96 through means of a hydraulic system 116 shown schematically in FIG. 2. The system 116 comprises a pump 118 having its intake connected to a reservoir 120 and having its exhaust connected in parallel to a pair of clutch control valves 122 and 124, which are also connected to the reservoir 120. The control valves 122 and 124 are respectively connected to the annular cylinders 98 and 100 leftwardly of the pistons 94 and 96. The valves 122 and 124, as illustrated here, are two-position valves and are each shown in an upper clutch-released position wherein the cylinders 98 and 100 are connected to the reservoir 120.

The valves 122 and 124 are selectively shiftable downwardly from the positions shown to clutch-engaging positions wherein the cylinders 98 and 100 are connected to the pump 118.

Thus, it can be seen that when the clutch valves are in their clutch-released positions, no force will be applied to the radially inner ends of the sets of actuating levers 84 and 86 and the springs 78 and 80 will act to hold the pressure plates 68 and 70 away from the friction elements 56 and 58. On the other hand, when the clutch valves are in their clutch-engaged positions, the pistons 94 and 96 will be in pressure-shifted positions, rightwardly of the position illustrated, and the levers 84 and 86 will be in pivoted positions whereat they respectively act on the bolts 72 and the screws 92 to hold the pressure plates 68 and 70 in shifted position wherein the friction elements 56 and 58 are respectively sandwiched between the pressure plate 68 and the right face of the backing plate 60 and between the pressure plate 70 and the left face of the backing plate 60, thus establishing a driving connection between the engine output shaft 18 and the traction and PTO drive input shafts 22 and 26.

In order to increase the wear life of the traction and PTO clutch friction elements 56 and 58, the backing plate 60 and the pressure plates 68 and 70, fluid is supplied for lubricating and cooling the interfaces of the friction elements and the plates during their engagement. The flow of lubrication fluid is controlled in part by a pilot-operated, pressure responsive valve 126. The valve 126 comprises a bore 128 formed vertically in the support wall 16 and intersected at axially-spaced locations by an outlet port 130, an inlet port 132, an exhaust port 134, a first pilot pressure port 136 and a second pilot pressure port 138, the ports being respectively arranged serially from the top to the bottom of the bore 128. For the purpose of controlling the flow among the inlet, exhaust and outlet ports, a valve spool 140 is slidably mounted in the bore 128. The spool 140 comprises upper and lower lands 142 and 144, respectively, separated by an intermediate annular groove 146. The spool 140 is shiftable, in a manner to be presently described, among a lower position (the position shown) wherein the inlet and exhaust ports are connected via the groove 146 and the upper land 142 blocks the outlet port, an intermediate position wherein the upper land 142 blocks only a portion of the outlet port, the inlet and outlet ports are connected via the groove 146 and the lower land 144 partially blocks the exhaust port, and an upper position wherein the inlet and outlet ports are connected in full-fluid communication via the groove 146 and the lower land 144 blocks the exhaust port. The valve spool 140 is normally biased to the lower position by means of a spring 148 which acts between the valve spool and a plug in the upper end of the valve bore. The valve spool 140 is limited in its downward movement by a stop pin 150 which traverses the bore 128 at a location between the exhaust and first pilot pressure ports and engages the bottom of a notch 152 extending upwardly in the bottom end of the spool.

The valve spool 140 is shiftable in response to the actuating pressure located in the cylinders 98 and 100 leftwardly of the traction and PTO clutch actuating pistons 94 and 96. To accomplish this function, the pilot pressure ports 136 and 138 are respectively connected to the cylinders 98 and 100 via fluid passages here represented by lines 154 and 156. The valve bore 128 includes a reduced in diameter portion extending between the ports 136 and 138 and reciprocably mounted in this portion is a valve spool actuating or pilot pin 158, which also serves to prevent the flow of fluid between the ports 136 and 138.

When the cylinders 98 and 100 are connected to the reservoir, as illustrated, the pin 158 occupies a lower position wherein the bottom of the pin 158 rests on a wall forming the lower end of the bore 128 and the upper end of the pin is received in the lower portion of a bore 160 extending axially into the lower end of the spool 140 coextensively with, and approximately half the distance as, the notch 152. It is to be noted that the notch 152 is dimensioned so as to not permit the passage of the pin 158.

When only the cylinder 100 is pressurized, the pin 158 will be shifted upwardly by pilot pressure in the port 138 to engage the top thereof with the end of the bore 160 resulting then in the valve spool 140 being shifted to its intermediate position, the upper end of the pin 158 then engaging the stop pin 150.

When both of the cylinders 98 and 100 are pressurized or when only the cylinder 98 is pressurized, the spool 140 will be shifted to its upper position by pilot pressure in the port 136, which acts directly on the bottom of the spool.

Fluid is supplied to the inlet port 132 of the valve 126 by a pressure source here shown as a small pump 162. When the valve spool 140 is in its intermediate or upper position, fluid supplied by the pump 162 is directed through the outlet port 130 to a supply passage 164 defined in part by an annular space 166 between the traction and PTO drive input shafts 22 and 26. Radial openings 168 in the shaft 26 fluid-connect the space 166 with an annular groove 170 in the PTO clutch member hub 42, the groove 170 in turn being fluid-connected, via radial passages 172, to an annular space 174 formed between the central portion of the hub 42 and the rim 50. Further radial passages 176 in the rim 50 fluid-connect the annular space 174 with the opposite faces of the friction disc element 58 and with the right and left faces of the backing and pressure plates 60 and 70, respectively. The annular groove 170 of the hub 42 is also connected to a second annular groove 178 in the hub 42 by means of a restricted passage 180 formed between the hub 42 and the shaft 26. The passage 180 acts to substantially prevent flow to the groove 178, for a purpose to be presently explained, when the valve spool 140 is in its intermediate position permitting only a preselected limited flow to the supply passage 164. In other words, when the flow supplied to the passage 164 is less than the preselected amount, the restricted passage 180 presents a resistance to the flow which is enough greater than that presented by the radial passages 172 that most of the flow will pass through the passages 172. The groove 178 is connected, via openings 182, to an annular space 184 bounded radially outwardly by the rim 54 of the hub 40. Located in the rim 54 are radial passages 186 which fluid-connect the space 184 with the opposite faces of the friction disc element 56 and with the right and left faces of the backing and pressure plates 60 and 68, respectively.

The operation of the traction and PTO clutches is as follows. Assuming that the operator wishes the traction and PTO drive input shafts 22 and 26 to be disconnected from the engine output shaft 18, the operator will place the control valves 122 and 124 in the position shown wherein pressure fluid is blocked from the cylinders 98 and 100 and the latter are connected to the reservoir 120. Thus, any pressure acting on the pistons 94 and 96 is relieved and the springs 78 and 80 act to hold the pressure plates 68 and 70 separated from the traction and PTO clutch member friction disc elements 56 and 58, respectively. Thus, the clutch members are disengaged and no driving engagement is established between the engine output shaft and the traction and PTO drive input shafts.

When the traction and PTO clutch members are disengaged, the lubrication fluid control valve 126 is in the condition illustrated. Specifically, since the pressure in the cylinders 98 and 100 is relieved, no pressure exists in the ports 136 and 138 and the spring 148 acts to hold the valve spool 140 in its lower position, wherein flow between the inlet and outlet ports is prevented. Thus, the valve 126 acts to prevent the flow of lubrication fluid to the clutches when the latter are disengaged and do not need to be lubricated or cooled.

If the operator now wishes to engage only the PTO clutch, he will shift the control valve 124 downwardly, from the position shown, to connect the cylinder 100 to the pump 118. The pressure in the cylinder 100 forces the PTO clutch actuating piston 96 to the right which causes the levers 84 to be rotated resulting in the pressure plate 70 being pushed rightwardly against the friction disc elements 58 to urge the latter against the left face of the backing plate 60. A driving connection is thus established between the engine shaft 18 and the PTO drive input shaft 26.

Concurrently with the pressurizing of the cylinder 100, the pilot pressure port 138 is pressurized causing the valve actuating pin 158 to shift upwardly against the stop pin 150 and at the same time engage and move the valve spool 140 to its intermediate position wherein a preselected limited amount of fluid flow is permitted between the inlet and outlet ports. This limited amount of flow is carried by the passage 164 to the restricted passage 180 which presents such resistance to flow therethrough as to cause substantially all of the limited flow to pass, via the passages 172, the space 174 and the passages 176, to the PTO clutch friction disc elements 58 and the right and left faces of the pressure and backing plates 70 and 60 respectively. Thus, when the traction clutch means are disengaged, no lubricating fluid is supplied thereto. This feature is important since if lubrication fluid were supplied to the disengaged traction clutch elements, the fluid itself would act as a clutching element causing a certain amount of undesirable drag between the disc elements 56 and the pressure and backing plates 68 and 60.

If the operator wishes to engage the traction clutch after the PTO clutch is engaged, he may do so merely by shifting the control valve 122 downwardly, from the position shown, to connect the cylinder 98 to the pump 118, the pressure in the cylinder 98 forcing the traction clutch actuating piston 94 rightwardly to cause the levers 82 to be rotated, resulting in the pressure plate 68 being pulled leftwardly against the friction disc elements 56 to engage the latter with the right face of the backing plate 60. A driving connection is thus established between the engine shaft 18 and the traction drive input shaft 22.

Concurrently with the pressurizing of the cylinder 98, the pilot pressure port 136 is pressurized, the pressure acting on the bottom of the valve spool 140 to shift the latter upwardly to its upper position wherein unrestricted flow is permitted between the inlet and outlet ports. This unrestricted flow passes through the supply passage 164 until it encounters the restricted passage 180. The flow is now much greater than that which can pass without undue resistance through the passages 172 and a portion of the flow passes through the passage 180 to the annular groove 178 and from there passes, via the openings 182, the space 184 and the passages 186, to the surfaces of the friction disc elements 56 and the backing and pressure plates 60 and 68.

What is claimed is:

1. In an agricultural tractor of the type including an engine flywheel having a clutch backing plate means secured thereto for rotation therewith, traction wheel and power take-off drive means respectively including first and second concentrically arranged input drive shafts disposed coaxially with said flywheel and having ends terminating in the vicinity of the backing plate means, first and second clutch members respectively fixed for rotation with the first and second input drive shafts, the first and second clutch members respectively including friction disc elements axially shiftably mounted for engagement and disengagement with the opposite axial faces of the backing plate means, first and second pressure plate means respectively mounted for rotation with and for axial movement relative to said flywheel at respective positions confronting the faces of the disc elements remote from the backing plate means; first and second sets of levers connected for selectively moving the first and second pressure plate means axially in opposite directions when the levers are moved in a common direction; the improvement comprising: a pair of concentric annular hydraulic pistons disposed concentrically about the first and second drive input shafts; said first and second sets of levers being respectively located in the path of movement of the pair of pistons; spring means normally biasing said pressure plate means away from engagement with the backing plate; hydraulic control means for selectively actuating one or the other or both of the pair of pistons for respectively effecting engagement of one or the other or both of the pressure plate means respectively with one or the other of the friction disc means to engage the latter with a respective side of the backing plate; and a source of lubrication fluid; passage means fluid-connecting said source to the opposed faces of the friction disc means and the backing and pressure plate means; pressure responsive valve means interposed in said passage means and responsive to the respective operating pressures of said pair of pistons for blocking the flow of lubrication oil to said clutch members when both pistons are deactivated and for permitting the flow of lubrication oil to the opposed faces of the friction disc means and the backing and pressure plate means when both pistons are activated.

2. The invention defined in claim 1 wherein said valve means further includes means for directing a preselected limited flow of lubrication fluid to said passage means when only the piston for operating the second set of levers is activated; and said passage means including flow restriction means for directing substantially the entire amount of said limited flow to the opposed faces of said second friction disc element, said second pressure plate means and said backing plate.

3. The invention defined in claim 2 wherein the first input drive shaft is located interiorly of said second input drive shaft; said first and second clutch members respectively having hubs splined to said first and second input drive shafts; said fluid passage means including: a first space between said first and second input drive shafts and a second space between the hub of the second clutch member and the second input drive shaft, the spaces being interconnected by opening means extending through the second input drive shaft; said second space including first and second enlarged portions interconnected by a restricted passage, said first enlarged portion being upstream from said second enlarged portion; said first and second enlarged portions being respectively connected to first and second radial passage means leading respectively to the friction disc elements of the second clutch member and friction disc elements of the first clutch member; and said restricted passage being sized such that when said valve means is directing said preselected limited flow of fluid to the passage means, as when only the second clutch member is engaged, substantially all of the flow is blocked from the second enlarged portion and caused to flow through said first radial passage means to said friction disc element of the second clutch member.

4. A tractor transmission assembly, comprising: a powered shaft having clutch backing plate means secured thereto for rotation therewith; traction wheel and power take-off drive means respectively including first and second drive input shafts disposed coaxially with said powered shaft and having ends terminating in the vicinity of the backing plate means, first and second clutch members respectively fixed for rotation with said first and second drive input shafts and respectively including first and second axially shiftable friction disc elements disposed for engagement with the backing plate means; control means including first and second hydraulic actuator means for selectively engaging and disengaging said first and second friction disc elements with said backing plate means for establishing a driving connection between the powered shaft and one or the other or both of the traction wheels and power take-off drive means, the improvement comprising: said first and second friction disc elements being oil cooled; supplying means for providing cooling oil including first and second pilot lines respectively connected to the first and second hydraulic actuator means to monitor the clutch activating pressure thereat; a source of fluid pressure, a cooling oil direction control valve means including a valve bore connected to the source of fluid pressure, the sump and the first and second pilot lines; fluid passage means connecting said valve bore to said first and second friction disc elements to provide cooling oil to the latter; and pressure responsive valve member means shiftably mounted in said bore for blocking the flow of fluid from the source of fluid pressure to the first and second friction disc elements when both hydraulic actuator means are depressurized and for connecting the source of fluid pressure to the friction disc elements when both hydraulic actuator means are pressurized.

5. The invention defined in claim 4 wherein said valve member means includes means for directing a flow of fluid no greater than a preselected limited flow of lubrication fluid to said fluid passage means when only the second hydraulic actuator means is being pressurized; and said passage means including flow restriction means for directing substantially the entire amount of said limited flow to the second friction disc elements.

6. The invention defined in claim 4 wherein said valve member means includes a spool member having opposite first and second ends; a stop means being located in said bore in the path of movement of said first end; biasing means acting on said second end and normally positioning said spool member in a first position, against said stop means, wherein said source of fluid pressure is blocked from fluid communication with said fluid passage means; said first pilot line being connected to said bore in direct communication with said first end of the spool member; and said spool member being shiftable away from the stop means against said biasing means, in response to fluid pressure in said first pilot line, to a second position wherein flow greater than a preselected limited amount of flow is permitted between said source of fluid pressure and said fluid passage means.

7. The invention defined in claim 6 wherein said second pilot line is connected to said bore at a location spaced axially both from the first end of the spool member and the location whereat the first pilot line connects to the bore; a pilot pin being axially shiftably mounted in the bore between, and preventing fluid flow between the locations whereat the first and second pilot lines are connected to the bore; said pilot pin having one end positioned for contacting the first end of the spool member and having an opposite end in fluid communication with the second pilot line; said pilot pin being shiftable against said spool member for moving the latter against said biasing means in response to fluid pressure in said second pilot line; second stop means located in said bore in the path of movement of said pilot pin in the direction of the spool member, the stop means being positioned to contact the one end of the pilot pin after the valve member is shifted to an intermediate position between said first and second positions, permitting flow no greater than said preselected limited amount of flow to occur between said source of fluid pressure and the fluid passage means; and fluid restriction means being positioned in said fluid passage means between said first and second friction disc elements for permitting flow to said first friction disc elements only when the flow from the source of fluid pressure to the fluid passage means is greater than said preselected limited amount.

8. The invention defined in claim 7 wherein the first-mentioned stop means and said second stop means are defined by the opposite sides of a stop pin fixed transversely in the bore.

9. The invention defined in claim 4 wherein the first input drive shaft is located concentric with and interiorly of said second input drive shaft; said first and second clutch members including respective hubs splined to said first and second input drive shafts; said fluid passage means including: a first space between said first and second input drive shafts and a second space between the hub of the second clutch member and the second input drive shaft, the spaces being interconnected by opening means extending through the second input drive shaft; said second space including first and second enlarged portions interconnected by a restricted passage, said first enlarged portion being upstream from said second enlarged portion; said first and second enlarged portions being respectively connected to first and second radial passage means leading to the friction disc elements of the second and first clutch members; said restricted passage means being sized such that substantially all flow below a preselected minimum flow will be directed to the friction disc elements of said second clutch member; and said valve member means including means for directing a flow of fluid no greater than said preselected limited flow of fluid, to said fluid passage means when only the second hydraulic actuator means is being pressurized.

* * * * *